(12) United States Patent
Dreier et al.

(10) Patent No.: US 10,742,907 B2
(45) Date of Patent: Aug. 11, 2020

(54) CAMERA DEVICE AND METHOD FOR DETECTING A SURROUNDING AREA OF A DRIVER'S OWN VEHICLE

(71) Applicant: Conti Temic microelectronic GmbH, Nuremberg (DE)

(72) Inventors: Florian Dreier, Lindau (DE); Dieter Kroekel, Eriskirch (DE); Karsten Breuer, Oberreute (DE); Boris Werthessen, Weissensberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/319,666

(22) PCT Filed: Jul. 4, 2017

(86) PCT No.: PCT/DE2017/200060
§ 371 (c)(1),
(2) Date: Jan. 22, 2019

(87) PCT Pub. No.: WO2018/014916
PCT Pub. Date: Jan. 25, 2018

(65) Prior Publication Data
US 2020/0059613 A1    Feb. 20, 2020

(30) Foreign Application Priority Data
Jul. 22, 2016   (DE) .................. 10 2016 213 494

(51) Int. Cl.
*H04N 5/345*    (2011.01)
*H04N 5/347*    (2011.01)
(Continued)

(52) U.S. Cl.
CPC ........... *H04N 5/3456* (2013.01); *H04N 5/347* (2013.01)

(58) Field of Classification Search
CPC ...... H04N 5/3456; H04N 5/347; B60R 1/007; B60R 21/01538; B60R 2300/105;
(Continued)

(56) References Cited

U.S. PATENT DOCUMENTS

| 10,002,561 B1 | 6/2018 | Tridico |
| 2003/0048202 A1* | 3/2003 | Francois ............ G08B 13/1965 340/945 |

(Continued)

FOREIGN PATENT DOCUMENTS

| DE | 102004061998 | 7/2006 |
| DE | 102013221882 | 4/2015 |

(Continued)

OTHER PUBLICATIONS

English translation of the International Search Report of the International Searching Authority for International Application PCT/DE2017/200060, dated Sep. 11, 2017, 3 pages, European Patent Office, HV Rijswijk, Netherlands.

(Continued)

*Primary Examiner* — Alexander Gee
(74) *Attorney, Agent, or Firm* — W. F. Fasse

(57) ABSTRACT

A camera device for detecting a surrounding area of a subject vehicle has optoelectronics including a high-resolution image capturing sensor and a wide-angle optical system. The optoelectronics are designed to output an image sequence of the surrounding area with a periodic variation of high-resolution images and resolution-reduced images.

18 Claims, 3 Drawing Sheets

(51) Int. Cl.
*B60R 1/00* (2006.01)
*H04N 7/18* (2006.01)
*H04N 5/232* (2006.01)
*H04N 5/343* (2011.01)

(58) Field of Classification Search
CPC ........ B60R 2300/202; B60R 2300/301; B60R 2300/302; B60R 2300/306; B60R 2300/60; B60R 2300/802; B60R 2300/8033; B60R 2300/804; B60R 2300/8093; G06T 2207/30248; G06T 2207/30252
See application file for complete search history.

(56) References Cited

U.S. PATENT DOCUMENTS

| | | |
|---|---|---|
| 2003/0198393 A1 | 10/2003 | Berstis |
| 2004/0141067 A1* | 7/2004 | Nakayama ........... H04N 1/0411 348/222.1 |
| 2006/0266835 A1 | 11/2006 | Tanida |
| 2008/0199069 A1 | 8/2008 | Schick et al. |
| 2008/0291304 A1 | 11/2008 | Ota et al. |
| 2012/0038991 A1* | 2/2012 | Miyano ................. G02B 23/14 359/643 |
| 2014/0293057 A1 | 10/2014 | Wierich |
| 2014/0293080 A1* | 10/2014 | Choi ................... H04N 5/3456 348/222.1 |
| 2014/0368823 A1* | 12/2014 | Wirthlin ................ G01N 21/55 356/448 |
| 2015/0274179 A1* | 10/2015 | Inoue .................. B60W 50/087 701/70 |
| 2016/0167583 A1 | 6/2016 | Schrepfer |
| 2017/0132479 A1* | 5/2017 | Krokel ............... G06K 9/00818 |
| 2017/0244775 A1* | 8/2017 | Ha ........................ G06T 19/006 |
| 2018/0012085 A1* | 1/2018 | Blayvas ................. G06F 3/017 |
| 2020/0059598 A1 | 2/2020 | Breuer et al. |

FOREIGN PATENT DOCUMENTS

| | | |
|---|---|---|
| DE | 102014215372 | 2/2016 |
| DE | 102015208889 | 11/2016 |
| EP | 1 953 698 | 8/2008 |
| EP | 2 623 374 | 8/2013 |

OTHER PUBLICATIONS

PCT International Preliminary Report on Patentability including English Translation of PCT Written Opinion of the International Searching Authority for International Application PCT/DE2017/200060, dated Jan. 22, 2019, 8 pages, International Bureau of WIPO, Geneva, Switzerland.

German Search Report for German Patent Application No. 10 2016 213 494.9, dated Apr. 4, 2017, 8 pages, German Patent and Trademark Office, Muenchen, Germany, with partial English translation, 7 pages.

Patrice Roulet et al., "Multi-Task Single Lens for Automotive Vision Applications", Proceedings of SPIE, vol. 7314, May 1, 2009, XP055166773, ISSN: 0277-786X, 14 pages.

* cited by examiner

CAMERA DEVICE AND METHOD FOR DETECTING A SURROUNDING AREA OF A DRIVER'S OWN VEHICLE

FIELD OF THE INVENTION

The invention relates to a camera device and a method for detecting a surrounding area of a driver's own vehicle. The invention further relates to the vehicle with such a camera device.

BACKGROUND INFORMATION

In order to produce driver assistance devices such as traffic sign recognition or a lane departure warning system, camera systems require a horizontal viewing angle of approx. 50 degrees and a vertical viewing angle of approx. 30 degrees. However, new functions such as cross traffic or traffic light recognition notably require a much larger viewing angle in order to be able to detect objects located in the peripheral area of the image during tailgating. In contrast, highly automated driving or a lane departure warning system, for example, also requires recognition of objects and roadway structures at a great distance, necessitating a corresponding resolution.

In connection with this, camera systems with at least two optoelectronic systems are known, for example, which differ at least in the viewing angle and/or in the angle resolution, in order to consequently meet the opposing requirements of detecting the central area with a long range and detecting a wide-angle area for recognizing cross traffic. Thus, the printed publication DE102004061998A1, for example, describes a device for a motor vehicle with at least one first camera and at least one second camera, the first and the second camera differing in at least one camera property.

The disadvantages of such camera systems are, for example, the data quantities to be processed as well as the considerable costs due to the plurality of optoelectronics which are the most expensive components of a camera system.

SUMMARY OF THE INVENTION

The object of the invention is to create a camera device which realizes an efficient image processing and, at the same time, fulfils the requirements with respect to detailed capturing and as large a detection range as possible in order to produce driver assistance devices.

This object can be achieved by a camera device, a vehicle and a method respectively having the inventive features set forth herein. Advantageous or preferred embodiments of the invention are also set forth in the following description and the figures.

A camera device for detecting a surrounding area of a driver's own vehicle is proposed. The surrounding area is, for example, a surrounding area lying ahead in the direction of travel of the driver's own vehicle, a lateral surrounding area and/or a rear surrounding area.

The camera device comprises optoelectronics which are designed to capture an image sequence of the surrounding area. The image sequence preferably comprises at least two, in particular at least five, specifically at least 20 successively captured images.

The optoelectronics comprise a wide-angle optical system. The wide-angle optical system is preferably designed with a horizontal and/or vertical viewing angle of e.g. at least +/−50 degrees, in particular of at least +/−70 degrees and/or of at most +/−80 degrees to the optical axis. A peripheral environment such as a crossroads area can be detected, for example, by means of the wide-angle optical system for early object evaluation of crossing road users.

Furthermore, the optoelectronics comprise a high-resolution image capturing sensor. Object evaluation such as the evaluation of far-range traffic signs or lanes, consequently in particular in a distance range from the driver's own vehicle of at least 50 meters, is in particular made possible by means of the high-resolution image capturing sensor. The term 'high-resolution image capturing sensor' denotes, in particular, an image capturing sensor with a number of pixels of several megapixels, for example of at least five megapixels, preferably of at least seven megapixels, specifically of at least ten megapixels. The image capturing sensor preferably has a homogeneous pixel/cm resolution.

High-resolution image capturing sensors are classed as unsuitable for automotive use, in particular in connection with a wide-angle optical system, since they do not permit efficient processing of the large number of pixels for the elaborate image processsing algorithms.

Against this background, the optoelectronics, in particular the image capturing sensor or an image processing apparatus of the optoelectronics, is/are designed to output an image sequence of the surrounding area with a periodic exchange of high-resolution and resolution-reduced images e.g. to an image evaluation apparatus of the camera device. Consequently, images of the image sequence are, in particular, output alternately in high resolution and in a resolution-reduced manner with a specified regularity. For example, the optoelectronics are designed to output at least every tenth, in particular at least every fifth, particularly preferably every second image of the image sequence in a resolution-reduced manner. In particular, no arbitrary selection of an image, which is to have its resolution reduced, is made from the image sequence.

In particular, the high-resolution images have a higher resolution than the resolution-reduced images. The term 'high-resolution image' preferably denotes, at least in sections, a resolution in the horizontal and/or vertical viewing angle of at least 40 pixels per degree, specifically of at least 50 pixels per degree. For example, the high-resolution image is output with the maximum available resolution by the optoelectronics.

The term 'resolution-reduced image' denotes, in particular, an image which has a reduced resolution throughout the image region. For example, the resolution-reduced images each have, at least in sections, a resolution in the horizontal and/or vertical viewing angle of at most 30 pixels per degree, specifically of at most 20 pixels per degree. The images output in a resolution-reduced manner preferably have at least approximately the same number of pixels and/or a standardized, specifically uniformly distributed pixel size distribution.

One significant advantage of the periodic exchange is the, on average, approximately similar or slightly higher computational cost for evaluating the images, compared to vehicle cameras which, in order to realize a feasible image processing outlay, have up to now either had such low resolution rates that far-range evaluation is not possible or is insufficiently possible or, due to an otherwise too high computational cost, exclusively have such a small detection area that could possibly result in at least a belated evaluation of relevant target objects.

Consequently, despite the high-resolution image capturing sensor and the wide-angle optical system, a computational cost can be produced according to the invention, which makes it possible to evaluate target objects in the periodically alternating high-resolution and resolution-reduced images. Accordingly, the conflicting goals of attaining as large a detection range as possible and, simultaneously, a sufficient resolution for evaluating far-range target objects with a feasible image processing outlay, in order to produce driver assistance devices, are fulfilled with only one camera device.

Furthermore, what is remarkable is, on the one hand, the compact dimensions and, on the other hand, the considerable cost saving of the camera device compared with camera devices with two or even three optoelectronic systems.

In a preferred configuration of the invention, the image capturing sensor of the optoelectronics is designed to capture the image sequence in the periodic exchange with the high-resolution and resolution-reduced images. Since, consequently, the image sequence has already been captured with the periodic exchange of high-resolution and resolution-reduced images, the optoelectronics, specifically the image capturing sensor, is/are designed to e.g. output the captured image sequence, at least non-modified in terms of the resolution and, optionally additionally, in terms of the field of vision.

In an alternative exemplary configuration, the image capturing sensor is designed to capture the image sequence with, in particular, exclusively high-resolution images. Furthermore, the image processing apparatus of the camera device, in particular the optoelectronics, is/are preferably designed to generate resolution-reduced images from the images captured in high resolution according to the periodic exchange, and to transmit them as the image sequence with the periodic exchange of high-resolution and resolution-reduced images e.g. to the optoelectronics, or to output them directly e.g. to an image evaluation apparatus. Consequently, in this embodiment example, the resolution is preferably reduced subsequently to the image capturing. The image capturing sensor is e.g. connected to the image processing apparatus in order to transmit the captured image sequence. The resolution-reduced images output by the image processing apparatus are preferably at least partially resolution-reduced, compared to the associated captured images.

In one preferred embodiment, the image capturing sensor or the image processing apparatus is designed to generate the images to be captured or respectively which have been captured, which are to have their resolution reduced, in a resolution-reduced manner by means of pixel binning. During pixel binning, neighboring pixels, e.g. within a line and/or a column or in an e.g. rectangular partial area of the image captured in each case, are in particular combined and assigned to a new pixel. Consequently, the resulting pixel matrix of the resolution-reduced image has, in particular, a lower resolution than the associated captured image.

Alternatively or optionally additionally, the image capturing sensor or the image processing apparatus is designed to generate the images to be captured or respectively which have been captured, which are to have their resolution reduced, in a resolution-reduced manner by means of pixel skipping. In particular, pixels in the initial image are skipped in a specified sequence during pixel skipping, so that only a partial amount of the pixels is preferably adopted for the output image. In this way, a lower resolution of the output image is, in particular, realized and, as a consequence, a reduction in the data quantity is achieved.

In particular, in each case, at least one or precisely one, high-resolution and resolution-reduced image is output per processing cycle, and the object evaluation of the images output in this processing cycle is effected. The temporally specified time interval of the processing cycle should not be exceeded, in order to ensure an early and reliable execution of driver assistance functions associated with the target object recognition.

Against this background, the images output in high resolution and in a resolution-reduced manner have, in a first preferred configuration of the invention, at least approximately the same number of pixels. In particular, the term 'at least approximately the same number of pixels' denotes a deviation of a maximum of 0.5 megapixels. Consequently, every image of the output image sequence has, in particular, a number of pixels of, for example, two megapixels. As a consequence, a high-resolution and a resolution-reduced image with the same number of pixels are output, for example, per processing cycle.

If, on the other hand, according to a second preferred configuration, at least three images, in particular at least two high-resolution and one resolution-reduced image are to be output per processing cycle, the at least two images output in high resolution preferably jointly have at least approximately the same number of pixels as the image output in a resolution-reduced manner. In this way, a constant utilization of the image evaluation apparatus is ensured, in particular unwanted peaks with an associated time-delaying image evaluation are prevented, for each processing cycle.

The images output in high resolution have, in particular, a smaller image size than the images output in a resolution-reduced manner. Consequently, the high-resolution and resolution-reduced images can have the same number of pixels without requiring a higher working capacity. In this way, the output of resolution-reduced images with a larger detection area and high-resolution images with a smaller detection area is made possible with a constant computational cost. As a consequence, an extensive and detailed object evaluation is made possible in a periodic exchange with a constant image processing outlay.

Relevant target objects in the peripheral image portion are, in particular, to be evaluated at low vehicle speeds in the urban environment, whereas they are to be evaluated at high vehicle speeds on roads out of town, in particular in the far range of the central image portion. Against this background, the camera device, specifically the image capturing sensor or the image processing apparatus, is preferably designed to specify an image size and/or location of the respective image to be output in high resolution within the total available capturing surface region of the image capturing sensor, the specification being effected as a function of a current established vehicle speed and/or a current established steer angle of the driver's own vehicle. The vehicle speed and/or the steer angle allow conclusions to be drawn regarding on which category of road the driver's own vehicle is currently located such as on a road in town or on the motorway. In this way, the evaluation of relevant target objects can be ensured in the required resolution.

Alternatively or optionally additionally, the camera device, specifically the image capturing sensor or the image processing apparatus, is preferably designed to specify the image size and/or location of the respective image to be output in high resolution as a function of an established transport area lying ahead and/or of the category of road on which the driver's own vehicle is currently located. By establishing the transport area lying ahead, relevant traffic areas with characteristic target objects such as a crossroads area with crossing road users can be detected. With respect to the category of road, a distinction is made, for example, between a motorway, a federal highway and/or a road in town. By establishing the transport area lying ahead and/or the category of road, it is possible to adjust the image size and/or location at least of the high-resolution images as a function of the current vehicle surroundings and, consequently, to individually adjust it/them e.g. for the target objects to be evaluated.

For example, the driver's own vehicle has a locating means such as a GPS sensor that is designed to determine the current position, consequently the current location, of the driver's own vehicle, in which the camera device can be or is integrated. Furthermore, the driver's own vehicle comprises, for example, a navigation data server inside the vehicle for calling up electronic maps. An evaluation unit of the driver's own vehicle is preferably designed to evaluate, by means of the determined position of the driver's own vehicle as well as by means of information data of the electronic maps, the transport area lying ahead and/or the category of road, starting from the current position of the driver's own vehicle and to transmit the evaluated transport area or respectively the category of road to the camera device.

The more extensively the far-range object evaluation is made possible, the more reliably and more proactively the driver assistance functions of the driver assistance devices can be executed. Against this background, a particularly preferred configuration makes provision for the captured images in the central image portion to have, in each case, at least partially a higher resolution, in particular at least double the resolution, than in the peripheral image portion. For example, the central image portion has a horizontal and/or a vertical viewing angle of at most +/−25 degrees and/or the peripheral image portion joining the central image portion has a horizontal and/or a vertical viewing angle of at least +/−50 degrees. The resolution particularly preferably decreases as the horizontal and/or vertical viewing angles increase(s) in terms of magnitude, at least in sections. In this way, both close-range target objects, for example in the distance range between one and 50 meters, and far-range target objects, for example in the distance range between 50 and 500 meters, in the central image portion can be evaluated. Since target objects located in the peripheral image portion, especially close-range target objects such as crossing cyclists, are to be evaluated in the crossroads area, a lower resolution e.g. due to an anamorphic wide-angle optical system is possible for the object evaluation.

In order to realize the at least partially higher resolution in the central image portion, it is preferred of the design configuration that the wide-angle optical system is designed with a non-uniform, in particular a non-linear, distortion and is specifically designed as an anamorphic wide-angle optical system. In particular, a resolution of up to 50 pixels per degree can be achieved by means of the non-uniform distortion as a function of the resolution of the image capturing sensor. In this way, the resolution which is required in particular for far-range object evaluation is made possible without an additional teleoptical system.

In a preferred further development, the wide-angle optical system has at least one or precisely one lens which is designed to be panamorph, specifically anamorphic, at least in sections, for example the spherical surface portion. Panamorph, specifically anamorphic, lenses produce, at least in sections, a distortion of the initial image and in particular make possible, due to their elliptical form, a larger coverage in terms of surface area compared with other lens forms, so that more pixels can be produced per imaged zone. In this way, an improved recognition of target objects is achieved in the central image portion despite the distortion.

The camera device preferably comprises an image evaluation apparatus. The image evaluation apparatus, specifically a processor used in the automotive sector, is preferably designed to evaluate, in each case, at least one target object from the images output by the optoelectronics such as lanes, pedestrians, cyclists and/or further road users.

A hierarchy, also known as a pyramid structure, of images of differing resolution is, in each case, preferably calculated from the high-resolution and resolution-reduced images of the output image sequence. For example, at least three images with a resolution are provided, which resolution is in each case lowered by a half, from the high-resolution and resolution-reduced images of the output image sequence. In particular, the lowest-resolution image of the image output in each case is scanned first by the image evaluation apparatus to recognize objects, in order to keep the computational cost as low as possible. If a target object is recognized by the image evaluation apparatus in the lowest-resolution image, recourse is preferably had to the next-highest resolution representation, in order to validate the object recognition in particular.

Furthermore, the camera device preferably comprises at least one driver assistance device such as a lane departure warning system or turning assistance device or is connectable thereto. The driver assistance device is, in particular, designed, as a function of the at least one evaluated target object, to carry out at least one passive and/or active driver assistance function such as a distance warning, emergency braking or an autonomous evasive maneuver.

A further subject matter of the invention relates to a vehicle with a camera device according to the preceding description.

The invention further relates to a method for detecting a surrounding area of a driver's own vehicle with a camera device according to the preceding description. According to the invention, the image sequence is output with the periodic exchange, for example in alternating form or in a specified order, of high-resolution and resolution-reduced images. For example, the image sequence is captured with high-resolution images and is output in the periodic exchange with non-modified high-resolution images and the resolution-reduced images. Alternatively, the image sequence is already captured with the periodic exchange of high-resolution and resolution-reduced images and output in a non-modified form.

For example, the resolution reduction of the respective image is effected by means of electronic pixel binning and/or pixel skipping on the image capturing sensor. Consequently, a partial amount of the total number of pixels is preferably exclusively output by the image capturing sensor, wherein the remainder of the number of pixels is masked or merged. Alternatively, resolution reduction takes place downstream of the image capturing, e.g. by means of subsequent pixel binning and/or pixel skipping.

In particular, the image sequence is output to an image evaluation apparatus in order to evaluate at least one target object. In each case, at least one target object is preferably evaluated from the images output in high resolution and in a resolution-reduced manner in the periodic exchange. A driver assistance function such as braking, warning and/or steering assistance is preferably executed, for example, on the basis of the at least one evaluated target object.

BRIEF DESCRIPTION OF THE DRAWINGS

Further features, advantages and effects of the invention are set out by the following description of preferred embodiment examples of the invention, wherein.

DETAILED DESCRIPTION OF EXAMPLE EMBODIMENTS OF THE INVENTION

Figure 1:
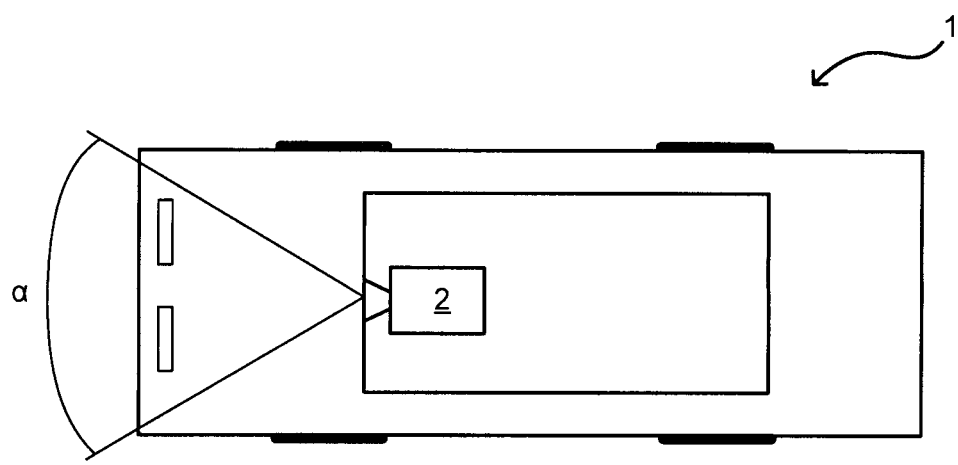
FIG. 1 shows a schematic top view of a vehicle comprising a camera device.

Parts corresponding to one another are provided with the same reference numeral in all of the figures.

FIG. 1 shows a schematic representation of a vehicle 1 with a camera device 2 for detecting a surrounding area lying ahead. In this embodiment example, the camera device 2 is a camera arranged in the interior of the driver's own vehicle 1 behind the windshield and aimed in the direction of travel of the driver's own vehicle 1. In particular, the camera device 2 is designed as a mono camera device 2 with precisely one optoelectronic system.

Figure 2:
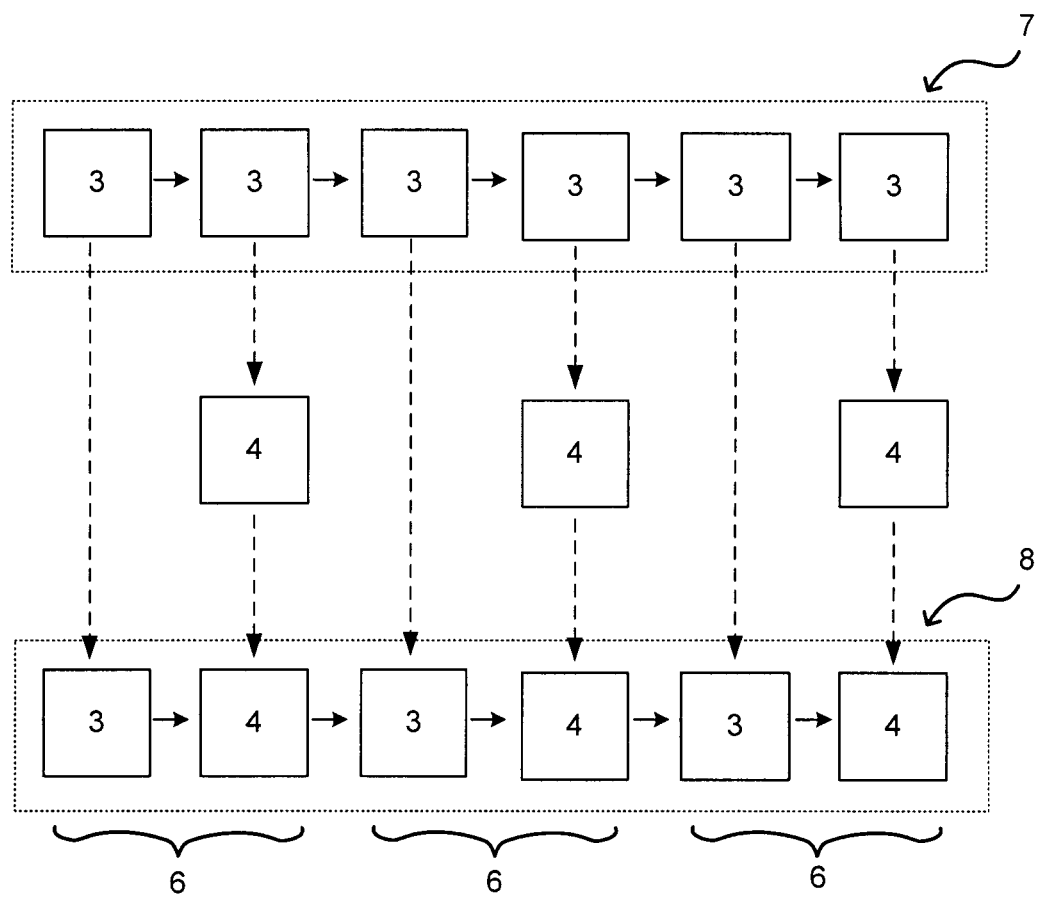
FIG. 2 shows a captured image sequence with high-resolution images as well as the image sequence output to an image evaluation apparatus with a periodic exchange of high-resolution and resolution-reduced images.
Figure 3:
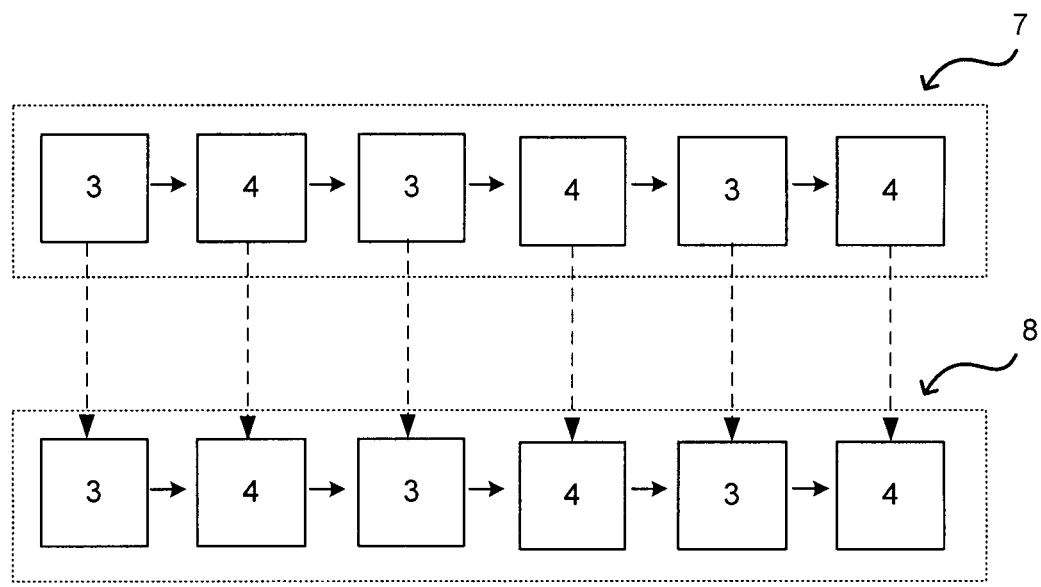
FIG. 3 shows a captured image sequence which is output in a non-modified form in terms of resolution with periodically alternating high-resolution and resolution-reduced images.

As represented by way of example in FIGS. 2 and 3, the optoelectronics of the camera device 2 are designed to capture an image sequence 7 of the surrounding area and to output the captured image sequence 7 as an image sequence 8 with a periodic exchange of high-resolution and resolution-reduced images 3, 4. An alternating exchange is illustrated, purely byway of example, in FIGS. 2 and 3. The utilization of an image evaluation apparatus of the following image processing can be advantageously kept approximately the same by means of the periodic exchange of high-resolution and resolution-reduced images 3, 4. In addition, the regular sequence of high-resolution and resolution-reduced images 3, 4, averaged, attains a data quantity which can be processed by the image evaluation apparatus in order to evaluate the target objects within a temporally specified processing cycle. At the same time, the evaluation of target objects in the resolution-reduced images 4 at least at close range and the evaluation of target objects in the high-resolution images 3 in the far range can be ensured.

According to the first embodiment example shown in FIG. 2, the optoelectronics of the camera device 2 are designed to capture an image sequence 7 with high-resolution images 3 of the surrounding area lying ahead. The image sequence 7 comprises, purely by way of example in FIG. 2, six images 3 which are successively captured in high resolution in a specified time interval.

In order to capture the high-resolution images 3, the optoelectronics comprise a wide-angle optical system and a high-resolution image capturing sensor. The wide-angle optical system has e.g. a horizontal and/or vertical viewing angle α, β of +/−50 degrees to the optical axis A. An early evaluation of target objects such as crossing road users is made possible by means of the wide-angle optical system. The image capturing sensor has, for example, a resolution of at least five megapixels. This resolution also produces the evaluation of far-range target objects. In this way, it is possible to dispense with e.g. cost-intensive multiple optoelectronics which are, in particular, provided to evaluate either the marginal image portion or the central image portion.

Consequently, the camera device 2 is, on the one hand, designed with a wide-angle detection range which can be notably required for the early recognition of crossing road users in the crossroads area or for traffic light recognition, for example. On the other hand, the at least one initial image is realized in high resolution, so that both close-range target objects, for example in the distance range between one and 50 meters, and far-range objects, for example in the distance range between 50 and 500 meters, can be evaluated. As a consequence, the conflicting goals of the wide-angle and tele range is achieved using individual optoelectronics.

According to the embodiment example of FIG. 2, the optoelectronics comprise an image processing apparatus which is, in particular, designed to generate the images 3 captured in high resolution by the image capturing sensor as resolution-reduced images 4 in the periodic exchange. In other words, the captured images 3 are preferably reduced in terms of their resolution, according to the pre-determined periodic exchange; an alternating exchange is represented by way of example in FIG. 2. In particular, the image sequence 8 is subsequently output with the periodic exchange of high-resolution and resolution-reduced images 3, 4 which are non-modified in terms of their resolution, to the image evaluation apparatus.

According to the second embodiment example shown in FIG. 3, the image capturing sensor is designed to capture the image sequence 8 with the periodic exchange of high-resolution and resolution-reduced images 3, 4 and, in particular, to output them, in a non-modified form in terms of their resolution, to the image evaluation apparatus. Since, in other words, the images 3, captured alternately in high resolution and in a resolution-reduced manner by the image capturing sensor in the periodic image sequence are at least output in a non-modified form in terms of their resolution, no subsequent resolution reduction is advantageously required.

For example, the image capturing sensor or respectively the image processing apparatus is designed to carry out the resolution reduction by means of pixel binning. The term 'pixel binning' denotes, in particular, combining multiple, for example four, physical pixels into one pixel. In the event of the four pixels being combined into one pixel, only ¼ of the physical number of pixels is to be processed as pixels.

The camera device 2, in particular the image capturing sensor, comprises e.g. the image evaluation apparatus that is designed to evaluate at least one target object, in each case, from the output images 3, 4. Moreover, the camera device 2 comprises e.g. at least one driver assistance device or is connectable to said driver assistance device of the driver's own vehicle 1. The driver assistance device is, in particular, designed to execute at least one driver assistance function on the basis of the target objects evaluated by the image evaluation apparatus.

The images 3, 4 output in high resolution and in a resolution-reduced manner have at least approximately the same number of pixels of e.g. two megapixels. At the same time, the images 3 output in high resolution have in particular a smaller image size than the images 4 output in a resolution-reduced manner, as shown by way of example in FIGS. 4 and 5.

Due to the output image sequence with the different image size of the high-resolution and resolution-reduced images 3, 4 and the at least approximately similar number of pixels, virtually the same working capacity is advantageously required at any rate and, consequently, the exceeding of the temporally specified processing cycle 6 is avoided.

Figure 4:
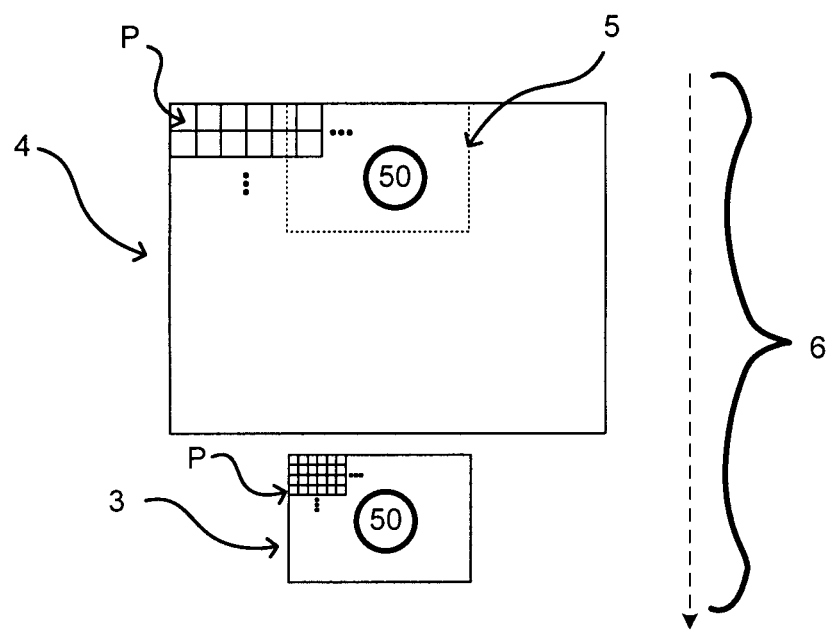
FIG. 4 shows an image output in a resolution-reduced manner and an image output in high resolution within one processing cycle as a first embodiment example.

FIG. 4 represents, byway of example, an embodiment example of a high-resolution and a resolution-reduced image 4 which have been captured e.g. within one processing cycle 6. The number and size of the pixels P in the resolution-reduced image 4, compared to the high-resolution image 3, are indicated purely schematically, in order to illustrate the different resolution based on the differences in image size despite the same number of pixels.

In particular, during an alternating exchange of high-resolution and resolution-reduced images 3, 4, as shown in FIG. 4, the high-resolution images 3 preferably have at least approximately the same number of pixels, in order to achieve an, on average, constant utilization of the image evaluation apparatus.

For example, the image size and/or location of the respective image 3 to be output in high resolution is specified within the total available capturing surface region of the image capturing sensor as a function of at least one image area of interest 5.

For example, the image area of interest 5 is a pre-defined search image region, consequently in particular a statically specified search image region. However, according to a preferred embodiment example, the image processing apparatus or the image capturing sensor is designed to specify the at least one image area of interest 5, in particular in the resolution-reduced images 4 in a variable manner, e.g. as a function of the traffic area lying ahead, the current category of road and/or the current vehicle speed. The image processing apparatus or the image capturing sensor is particularly preferably designed to track the at least one image area of interest 5 in the event of a target object evaluated herein in at least the subsequent image in order to keep track of the target object, so that object tracking of the target object to be kept track of is realized.

According to a preferred embodiment example, the image 3 output in high resolution has e.g. an image area of interest 5, which was established in a previously output image, according to FIG. 4 in an image 4 previously output in a resolution-reduced manner. The image area of interest 5 comprises, in particular, a target object which is, by way of example, a traffic sign.

Furthermore, it is possible for the image size and/or location of the respective image 3 to be output in high resolution within the total available image sensor capturing surface to be specified as a function of the vehicle speed, the steer angle, the transport area lying ahead and/or the category of road on which the driver's own vehicle 1 is currently located.

Due to the fact that, as the vehicle speed increases, an increasing resolution is likewise required in the central image portion, e.g. for the early evaluation of the traffic signs and/or of the course of the lane, the image area of interest 5 is preferably placed on a central image portion 9, for example in the event of a speed limit of e.g. 100 km/h being exceeded. Due to the fact that, at lower speeds, at least a sufficient resolution is to be ensured in the peripheral image portion 10 for early cross traffic and/or traffic light recognition, the image area of interest 5 is placed on a peripheral image portion 10, for example in the event of a speed limit of e.g. 30 km/h being fallen short of, specifically if the vehicle is stationary.

Figure 5:
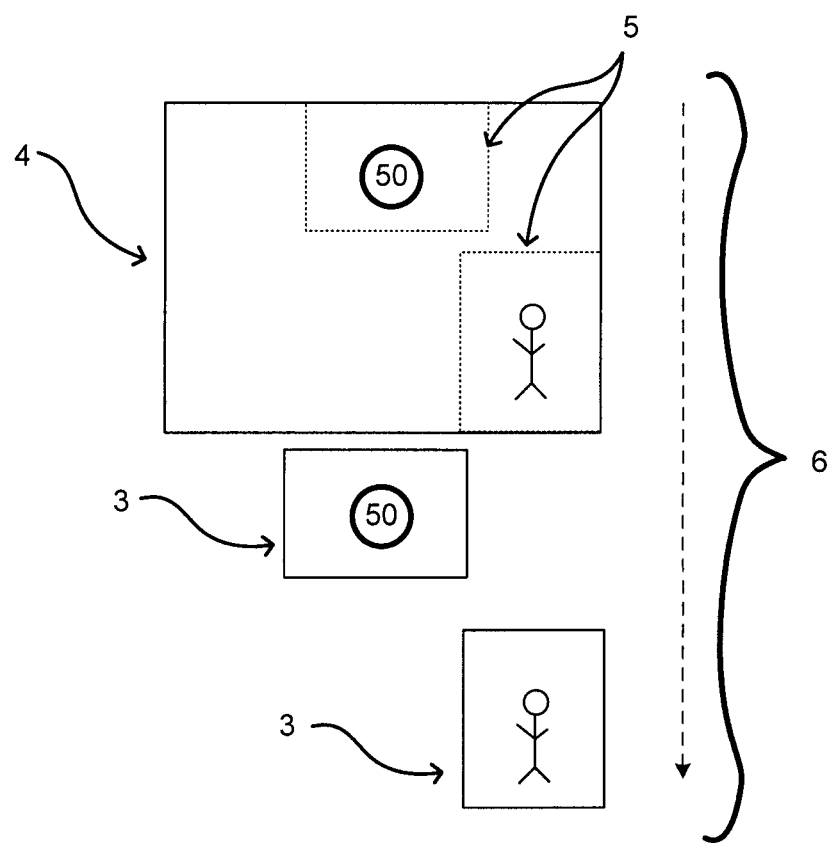
FIG. 5 shows one image output in a resolution-reduced manner and two images output in high resolution within one processing cycle as a second embodiment example.

FIG. 5 schematically shows an image 4 output in a resolution-reduced manner and two images 3 successively output in high resolution, which have been captured e.g. within one processing cycle 6. In this embodiment example, two regions of interest of the image 5 have been established in the resolution-reduced image 4, each of which comprises a target object, here by way of example a traffic sign and a pedestrian. The two images 3 subsequently output in high resolution each comprise one of the two regions of interest of the image 5. In this way, a reliable evaluation of the target objects is achieved. In FIG. 5, the image areas of interest 5 are represented free of overlapping. However, it can e.g. likewise be provided that the image areas of interest 5 are arranged in an overlapping manner and, consequently, the two successive images, at least two images 3, output in high resolution has an overlapping range.

The duration of the image evaluation should not exceed the specified time interval of the processing cycle 6, in order to ensure an early execution of the at least one driver assistance function. Against this background, the images 3 output in high resolution within the processing cycle 6 preferably jointly have at least approximately the same number of pixels as the image 4 output in a resolution-reduced manner. Thus, e.g. one of the images 3 output in high resolution comprises 0.5 megapixels and the second of the images output in high resolution comprises 1.5 megapixels, consequently making a total of 2 megapixels and, as a consequence, these correspond to the number of pixels indicated by way of example of the resolution-reduced image 4 of 2 megapixels. In this way, a constant utilization of the image evaluation apparatus is ensured.

Figure 6:
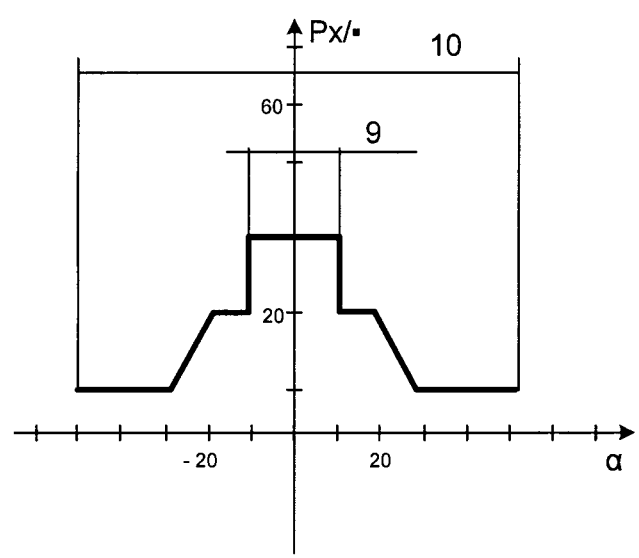
FIG. 6 shows a diagram of the resolution curve of a captured image, which has been captured with a camera device with an anamorphic optical system.

In FIG. 6, the resolution curve is plotted, by way of example, by means of the horizontal viewing angle α of an image captured by the camera device 2 according to the invention. In this embodiment example, the optoelectronics comprise a high-resolution image capturing sensor having 7.23 megapixels in 16:9 format and an anamorphic wide-angle optical system with a horizontal viewing angle α of +/−50 degrees. The resolution in the central image portion 9 is raised, compared to a linear wide-angle optical system, at least in sections, by means of the anamorphic wide-angle optical system, so that an even more extensive capturing of far-range target objects is made possible. The central image portion 9 in this example has a higher resolution than in the peripheral image portion 10.

LIST OF REFERENCE NUMERALS

1 Vehicle
2 Camera device
3 High-resolution image
4 Resolution-reduced image
5 Image area of interest
6 Processing cycle
7 Captured image sequence
8 Output image sequence
9 Central image portion
10 Peripheral image portion
α Horizontal viewing angle

The invention claimed is:
1. A camera device for detecting a surrounding area of a subject vehicle,
   comprising optoelectronics including a high-resolution image capturing sensor and a wide-angle optical system, wherein the optoelectronics are configured to output an image sequence periodically changing between high-resolution images and resolution-reduced images of the surrounding area, wherein each one of the images respectively includes a central image portion and a peripheral image portion adjoining the central image portion, wherein the peripheral image portion has a first resolution, and at least a part of the central image portion has a second resolution that is at least double the first resolution, and wherein the central image portion has a horizontal viewing angle of at most +/−25 degrees and/or the peripheral image portion has a horizontal viewing angle of at least +/−50 degrees.

2. The camera device according to claim 1, wherein the optoelectronics are configured to output the image sequence having the high-resolution images and the resolution-reduced images alternating with one another.

3. The camera device according to claim 1, wherein the image capturing sensor is configured to capture the image sequence periodically changing between the high-resolution images and the resolution-reduced images, and to output, without resolution modification, the high-resolution images that have been captured in a high resolution and the resolution-reduced images that have been captured in a lower resolution.

4. The camera device according to claim 1, wherein the image capturing sensor is configured to capture an initial image sequence with high-resolution images, wherein the optoelectronics further include an image processing apparatus configured to generate in a periodically changing manner, the resolution-reduced images from some of the high-resolution images captured in a high resolution in the initial image sequence, and to output the resolution-reduced images included in the image sequence periodically changing between the high-resolution images and the resolution-reduced images.

5. The camera device according to claim 4, wherein, to generate the resolution-reduced images from some of the high-resolution images, the image processing apparatus is configured to perform a resolution reduction by pixel binning and/or pixel skipping.

6. The camera device according to claim 1, wherein the high-resolution images and the resolution-reduced images all have at least approximately a same number of pixels for each one of the images.

7. The camera device according to claim 1, wherein the optoelectronics are configured to output a plurality of the high-resolution images and one of the resolution-reduced images per processing cycle in the image sequence, wherein the plurality of the high-resolution images jointly have at least approximately a same number of pixels as the one resolution-reduced image in the respective processing cycle.

8. The camera device according to claim 1, wherein the high-resolution images each respectively have a smaller image size than the resolution-reduced images.

9. The camera device according to claim 1, configured to specify an image size and/or a location of a respective one of the high-resolution images within a total available capturing surface region of the image capturing sensor, dependent on a traffic area in the surrounding area lying ahead of the subject vehicle, a category of a road on which the subject vehicle is currently located, a current established vehicle speed of the subject vehicle and/or a current steering angle of the subject vehicle.

10. The camera device according to claim 1, wherein the high-resolution images each respectively contain at least one image area of interest which has been established in a previously captured one of the images.

11. The camera device according to claim 1, wherein the high-resolution image capturing sensor has a resolution of at least five megapixels, and wherein the wide-angle optical system has a horizontal viewing angle and/or a vertical viewing angle of at least +/−50 degrees about an optical axis of the optical system.

12. The camera device according to claim 1, wherein the wide-angle optical system has a non-uniform distortion which is configured to realize the second resolution in the central image portion being at least double the first resolution in the peripheral image portion.

13. The camera device according to claim 1, further comprising an image evaluation apparatus that is configured to evaluate at least one target object in each one of the high-resolution images and the resolution-reduced images of the image sequence, and wherein the camera device further comprises a driver assistance device that is configured to carry out at least one driver assistance function dependent on the evaluated at least one target object.

14. A combination comprising a vehicle and the camera device according to claim 1.

15. A method of using the camera device according to claim 1, to detect the surrounding area of the subject vehicle, comprising outputting, with the optoelectronics, the image sequence periodically changing between the high-resolution images and the resolution-reduced images.

16. The camera device according to claim 1, wherein the central image portion has the horizontal viewing angle of at most +/−25 degrees.

17. The camera device according to claim 16, wherein the peripheral image portion has the horizontal viewing angle of at least +/−50 degrees.

18. The camera device according to claim 1, wherein the peripheral image portion has the horizontal viewing angle of at least +/−50 degrees.

\* \* \* \* \*